(12) United States Patent
Schifferer

(10) Patent No.: US 7,867,136 B2
(45) Date of Patent: Jan. 11, 2011

(54) METHOD FOR LIMITING DRIVE TRAIN TORQUE

(75) Inventor: Andrew N. Schifferer, Batavia, IL (US)

(73) Assignee: Caterpillar Inc, Peoria, IL (US)

( * ) Notice: Subject to any disclaimer, the term of this patent is extended or adjusted under 35 U.S.C. 154(b) by 497 days.

(21) Appl. No.: 11/724,251

(22) Filed: Mar. 15, 2007

(65) Prior Publication Data

US 2008/0227596 A1 Sep. 18, 2008

(51) Int. Cl.
F16H 61/38 (2006.01)
F16H 59/60 (2006.01)
F16H 59/62 (2006.01)
B60K 17/28 (2006.01)
B60K 25/00 (2006.01)
B60K 17/00 (2006.01)

(52) U.S. Cl. .................. 477/52; 477/97; 180/53.1; 180/338

(58) Field of Classification Search .............. 477/52, 477/97; 180/338, 197, 53.1; 701/50; 172/2
See application file for complete search history.

(56) References Cited

U.S. PATENT DOCUMENTS

| 4,237,748 A | * | 12/1980 | Brimmer et al. .......... 74/732.1 |
| 4,704,922 A | | 11/1987 | Suketomo et al. |
| 4,776,751 A | | 10/1988 | Saele |
| 5,457,633 A | | 10/1995 | Palmer et al. |
| 5,720,358 A | | 2/1998 | Christensen et al. |
| 6,234,254 B1 | | 5/2001 | Dietz et al. |
| 6,385,519 B2 | * | 5/2002 | Rocke ....................... 701/50 |
| 6,560,549 B2 | * | 5/2003 | Fonkalsrud et al. ........... 702/41 |
| 7,452,306 B2 | * | 11/2008 | Casey .......................... 477/97 |
| 2005/0278100 A1 | | 12/2005 | Porter |

FOREIGN PATENT DOCUMENTS

| EP | 1666711 A1 | 6/2006 |
| GB | 968574 | 9/1964 |

* cited by examiner

*Primary Examiner*—Tisha D Lewis
(74) *Attorney, Agent, or Firm*—Finnegan, Henderson, Farabow, Garrett & Dunner LLC

(57) ABSTRACT

A method is provided for limiting a torque output associated with a power conversion unit. The method may include receiving data related to a pressure associated with an implement system hydraulic cylinder, determining, based on the data, a preferred torque value, wherein the preferred torque value is below a predetermined threshold value associated with one or more drive train components, and modifying a torque output associated with a power conversion unit to approximate the preferred torque value.

20 Claims, 3 Drawing Sheets

METHOD FOR LIMITING DRIVE TRAIN TORQUE

TECHNICAL FIELD

This disclosure relates generally to control of a machine drive train and, more particularly, to a method for controlling torque to the machine drive train to prevent and/or limit damage.

BACKGROUND

Machines such as, for example, dozers, loaders, excavators, motor graders, and other types of heavy machinery typically include a power source linked to a power conversion unit. Such a configuration is used for transmitting torque from the power source to one or more axle assemblies operatively connected to one or more traction devices for movement of the vehicle over one or more supporting surfaces (e.g., the ground). Torque applied at the axle assemblies may result in rotational motion of components associated with the axle assemblies and, in turn, the traction devices. Thus, the machine may be put in motion based on available friction between the traction devices and the supporting surface, among other things.

The transmission of high torques from the power conversion unit to the axle assemblies may result in strain and possible damage to components of the axle assemblies, particularly where friction between the traction devices and supporting surface is high. Such strain and damage can eventually or immediately lead to failure of components associated with the axle assemblies (e.g., gear bending, gear pitting, roller bearing damage, ball bearing damage, etc.) and removal of the machine from operation for repairs. Therefore, it may be beneficial to implement systems and methods for determining current torque applied at an axle assembly and limiting such torque to a preferred torque value below which strain and damage may occur.

Previous systems and methods have been used to limit a transmission output torque for machines. Such systems can include position sensors configured to determine a position of an implement and adjusting engine speed to control engine torque output. For example, U.S. Pat. No. 6,234,254 (the '254 patent) issued to Dietz et al. on May 22, 2001, describes an apparatus for controlling the torque associated with a power train of a machine having an implement. A plurality of position sensors sense the position of the work implement and produce respective position signals. In addition, pressure sensors associated with implement system hydraulic cylinders may sense pressures in the cylinders and provide related information to the controller. This position information is processed by a controller to determine a "dig trigger" (i.e., is the implement in operation) and the engine speed is modified to control the power train torque such that efficient operation of the implement may be accomplished.

Although the system and method of the '254 patent may provide for controlling of power train torque based on implement position and/or pressure, it is targeted toward improving the work cycle of the implement. As such, it is limited to operation based on the dig trigger and implement pump pressures to optimize lift performance of the implement. In other words, there is no consideration for torques applied to an axle assembly or for limiting stress associated with axle assembly components, and therefore, such stress and potential damage may still occur.

The present disclosure is directed at overcoming one or more of the problems or disadvantages in the prior art control systems.

SUMMARY OF THE INVENTION

In one embodiment, the present disclosure is directed to a method for limiting a torque output associated with a power conversion unit. The method may include receiving data related to a pressure associated with an implement system hydraulic cylinder, determining, based on the data, a preferred torque value, wherein the preferred torque value is below a predetermined threshold value associated with one or more drive train components, and modifying a torque output associated with a power conversion unit related to the drive train to approximate the preferred torque value.

In another embodiment, the present disclosure is directed to a system for limiting a torque associated with a drive train. The system may include a power conversion unit related to the drive train, one or more hydraulic implement cylinders, and a control module. The control module may be configured to receive data related to a pressure associated with the one or more implement system hydraulic cylinders, determine, based on the data, a preferred torque value, wherein the preferred torque value is below a predetermined threshold value associated with one or more drive train components, and modify a torque output associated with the power conversion unit to approximate the preferred torque value.

In yet another embodiment, the present disclosure is directed to a machine. The machine may include a frame, a traction device associated with one or more drive train components, one or more implement system hydraulic cylinders, a power source mounted to the frame and operatively connected to a power conversion unit, and a control module. The control module may be configured to receive data related to a pressure associated with the one or more implement system hydraulic cylinders, determine, based on the data, a preferred torque value, wherein the preferred torque value is below a predetermined threshold value associated with one or more drive train components, and modify a torque output associated with the power conversion unit related to the drive train to approximate the preferred torque value.

DETAILED DESCRIPTION

Figure 1:
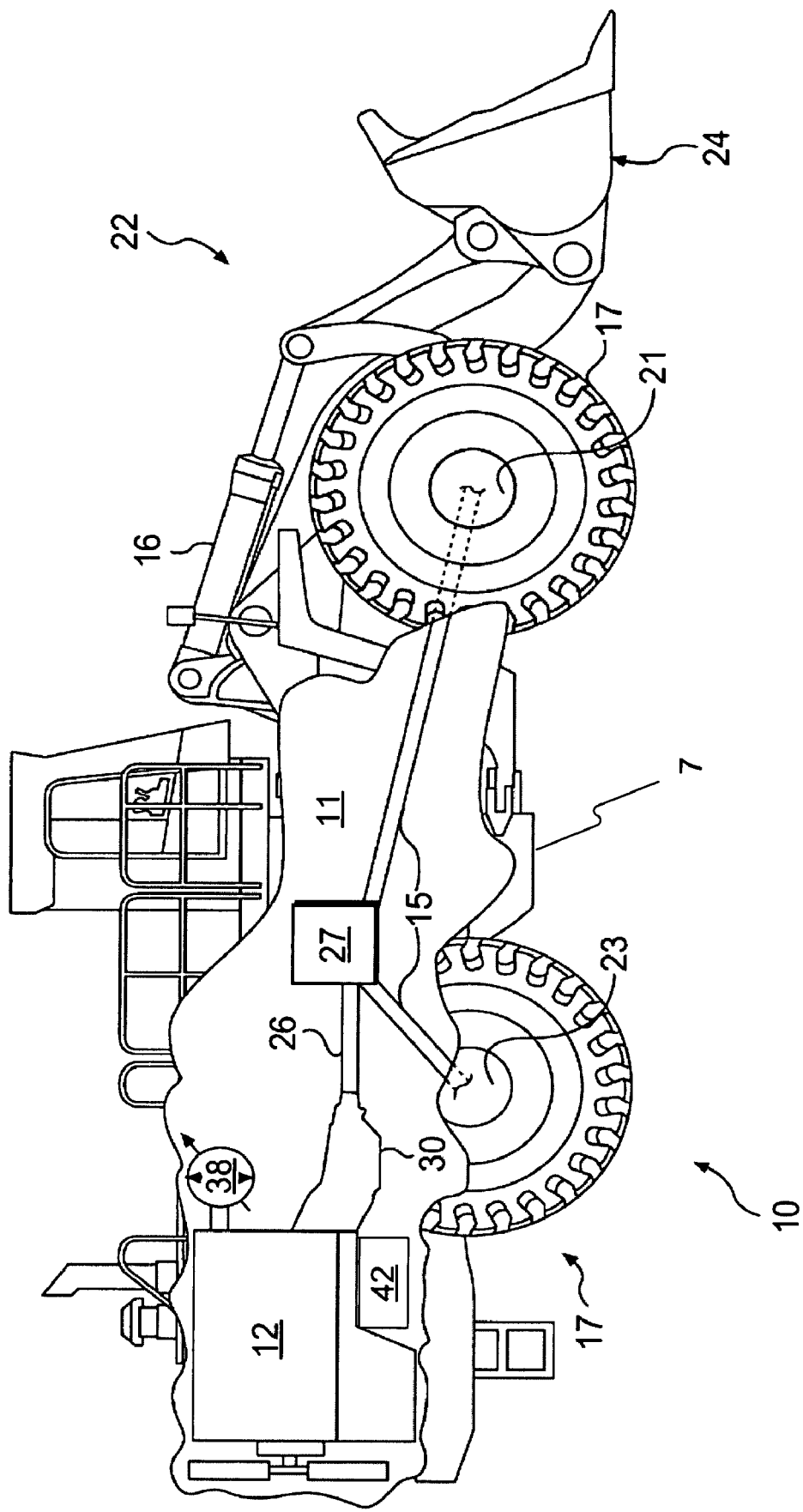
FIG. 1 illustrates an exemplary embodiment of a machine.

FIG. 1 illustrates an exemplary embodiment of a machine 10. Machine 10 may be a mobile machine that performs some type of operation associated with an industry such as mining, construction, farming, or any other industry known in the art. For example, machine 10 may be an earth moving machine such as a wheel loader, a dump truck, a backhoe, a motor grader, or any other suitable machine. Machine 10 may include a frame 7, a power source 12, a hydraulic pump 38, a drive train 11, and a control module 42. Machine 10 may further include one or more implement systems 22.

Power source 12 may include an engine such as, for example, a diesel engine, a gasoline engine, a gaseous fuel powered engine such as a natural gas engine, or any other engine apparent to one skilled in the art. Power source 12 may also embody another source of power such as a fuel cell, a power storage device, or any other source of power known in the art.

Power source 12 may include sensors configured to sense operational parameters associated with power source 12. Such sensors may include, for example, a speed sensor, a fuel flow sensor, and/or any other sensor associated with power source 12. Such sensors may include electrical and/or mechanical sensors or any combination thereof. For example, a magnetic pickup may be mounted near a flywheel associated with power source 12 such that a magnet on the flywheel may trigger a response in the pickup for each rotation of the flywheel.

Power source 12 may also include various systems configured to modify the operation of power source 12. For example, where power source 12 is configured as an internal combustion engine, power source 12 may include a device configured to modify fuel flow characteristics to power source 12, among other things, as is well known in the art.

Power source 12 may be operatively connected to a drive train 11 configured to transmit energy generated by power source 12. Drive train 11 may include a power conversion unit 30, final output shaft 26, one or more drive shafts 15 operatively connected to a front axle assembly 21 and/or a rear axle assembly 23, and one or more driven traction devices 17, among other things. Power conversion unit 30 may be any type of device configured for converting at least a portion of the power output supplied by power source 12 into a form useable at traction devices 17. For instance, power-conversion unit 30 may be a mechanical transmission including a fluidly connected torque converter and planetary gears configured to modify gear ratios associated with power-conversion unit 30. In another embodiment, power-conversion unit 30 may include a constantly or infinitely variable transmission including, for example, a dual shaft configuration and an infinitely variable gear set configured to provide varying gear and speed ratios. In yet another embodiment, power-conversion unit 30 may include an electric generator that converts at least a portion of the power output of power source 12 into electrical energy. In yet another embodiment, power conversion unit 30 may include a hydro-static system including a hydraulic pump configured to convert at least a portion of the power output of power source 12 into a flow of pressurized fluid for driving one or more hydraulic motors associated with traction devices 17. And, in yet another embodiment, power conversion unit 30 may include a split torque transmission such as that described in U.S. Pat. No. 5,667,452 to Coutant, the contents of which are herein incorporated by reference. One of ordinary skill in the art will understand that the methods of the present disclosure may be utilized in conjunction with numerous other power conversion units and the examples are meant to be exemplary only.

Power conversion unit 30 may include one or more shafts configured to accomplish a transfer of power from power source 12 to a final output shaft 26 of power conversion unit 30. For example, an input shaft configured to accept power input from power source 12, and an output shaft configured to output power to one or more drive train components in a suitable form (e.g., rotational energy) may be associated with power source 12. More or fewer shafts may be included with power conversion unit 30. For example, where power conversion unit 30 includes a torque converter (not shown), power conversion unit 30 may include an input shaft from power source 12 to the torque converter (not shown). Power conversion unit 30 may further include an output shaft from the torque converter (not shown) operatively connected to an input shaft associated with a gear set (not shown) associated with power conversion unit 30. The output shaft of the torque converter (not shown) may, therefore, function as the input shaft (i.e., one single shaft) to gear set (not shown). The gear set (not shown) may also include a final output shaft 26 operatively linking the gear set (not shown) of power conversion unit 30 with one or more components of drive train 11 (e.g., drive shafts 15).

Power conversion unit 30 may include one or more sensors configured to sense operational parameters associated with power conversion unit 30. For example, power conversion unit 30 may include an input shaft speed sensor and an output shaft speed sensor, among other things. Such sensors may include electrical and/or mechanical sensors or any combination thereof. For example, a magnetic pickup may be mounted near an input shaft associated with power conversion unit 30 and/or an output shaft associated with power conversion unit 30. Each magnetic pickup may be configured to detect gear teeth associated with the respective shaft (i.e., input or output) such that rotation of either shaft may trigger a response in the respective pickup during rotation of the shaft. In addition, power conversion unit 30 may include one or more sensors configured to provide information related to a gear selection associated with power conversion unit 30. Such a sensor may include a position sensor and/or any other sensors suitable for sensing data related to a gear selection.

Rotational speeds associated with input and output shafts associated with power conversion unit 30 may differ based on varying factors. Such factors may include, for example, a gear selection associated with drive train 11, a speed associated with power source 12, and/or friction associated with one or more traction devices 17, among other things. In one embodiment where power conversion unit 30 includes a torque converter (TC), a speed ratio may be calculated based on TC input and output shaft speeds according to equation 1 below. To calculate such a speed ratio, an output shaft speed associated with the TC may be divided by an input shaft speed associated with the TC to arrive at a speed ratio ($S_c$) as shown in equation 2 below. One of skill in the art will recognize that other speed ratios ($S_c$) may be calculated utilizing similar equations. Further, speed ratio calculation may not be utilized where torque output is known for a particular power conversion unit 30 (e.g., a constantly variable transmission).

$$S_c = \text{Speed Ratio} = \text{Output Speed/Input Speed} = W_{out}/W_{in} \quad (1)$$

$$S_c = TC \text{ Output Speed}/TC \text{ Input Speed} = W_{out}/W_{in} \quad (2)$$

Further, based on these equations, it may be possible to determine an output torque of the TC utilizing equation 3, where the related function may be determined for any particular model of torque converter.

$$T = f(W_{in}^2) \quad (3)$$

Therefore, by utilizing speed ratio data and related torque values (e.g., input torque), it may be possible to modify the torque output of the TC by manipulating a speed associated with power source 12 (i.e., input speed).

Where power conversion unit 30 does not include a torque converter, additional devices for controlling a torque output associated with power conversion unit 30 may be included. For example, where a continuously variable transmission is utilized, torque outputs may be controlled by manipulating a final speed ratio associated with power conversion unit 30. Such manipulation may be accomplished via mechanical methods, electro-mechanical methods, and/or any other suitable methods known in the art. Such manipulation of output torque may also be utilized in conjunction with other power conversion units. For example, where a power conversion unit 30 includes a hydro-static drive, a swash plate angle associated with a hydraulic pump may be manipulated to modify a torque associated with the pump. One of skill in the art will recognize that numerous other configurations may be utilized without departing from the scope of the present disclosure.

Drive shafts 15 may be operatively connected to final output shaft 26 of power conversion unit 30, by for example, a transfer unit 27 (e.g., a transfer case, transfer gearbox, or hydraulic linkage). Drive shafts 15 may include any driven members known in the art and configured to transmit power from power conversion unit 30 to front axle assembly 21 and/or rear axle assembly 23.

Front axle assembly 21 and rear axle assembly 23 may be operatively connected to at least one driven traction device 17 and may further provide support for machine 10 via driven traction devices 17. Axle assemblies 21 and 23 may, therefore, be configured to receive torque form power conversion unit 30 via drive shafts 15. Axle assemblies 21 and 23 may include any driven member known in the art for transmitting power from drive shafts 15 to driven traction devices 17. For example, axle assemblies 21 and 23 may include a housing, differential gears, bevel gears, pinion gears, final drive assembly, bearings, washers, and shafts, among other things, configured to transmit rotational energy to driven traction devices 17.

Front axle assembly 21 and rear axle assembly 23 may include particular limitations with respect to the amount of torque they may receive prior to being damaged. Such limits may be based on axle assembly design, component material, and axle assembly temperature, among other things. Therefore, predetermined threshold values for maximum torque may be determined experimentally and/or mathematically for any particular axle assembly configuration. Such data may then be stored for later use in determining a preferred torque value associated with power conversion unit 30.

Hydraulic pump 38 may be configured to produce a flow of fluid at a particular discharge pressure. Hydraulic pump 38 may include a variable displacement pump, a variable flow pump, or any other device for pressurizing a flow of fluid known in the art. For example, hydraulic pump 38 may be a variable displacement pump including a pump-flow control component such as a swash plate configured to vary the stroke of one or more pistons associated with the pump. A torque associated with hydraulic pump 38 may be calculated based on a flow associated with hydraulic pump 38 and a load on implement system 22.

Hydraulic pump 38 may be operatively connected to power source 12 by, for example, a countershaft, a belt, an electrical circuit, or in any other suitable manner. Additionally, pressurized fluid from hydraulic pump 38 may be supplied to numerous circuits included with machine 10.

Implement system 22 may include an implement 24 for performing various tasks including, for example, loading, compacting, lifting, brushing, and other desired tasks. Implement 24 may include numerous devices such as, for example, buckets, compactors, forked lifting devices, brushes, or other suitable devices as desired for accomplishing particular tasks. For example, machine 10 may be tasked to moving excavated earth from one point to another at a mine or similar site. Such an arrangement may be conducive to utilizing a bucket loader implement similar to that shown as implement 24. Further, implement system 22 may accomplish such tasks by imparting various motions to implement 24. Such motions may include, for example, rotating, extending, raising, lowering, tilting, and other suitable motions.

Implement system 22 may further include one or more implement system hydraulic cylinders 16 for performing actions associated with implement system 22 (e.g., lifting, tilting, and/or rotating implement 24) using a flow of pressurized fluid from hydraulic pump 38. Implement system hydraulic cylinders 16 may work in cooperation with various linkages associated with implement system 22 to perform the desired action. Motion of implement system 22 may be imparted via extension and retraction of pistons associated with the one or more implement system hydraulic cylinders 16. Such extension and retraction may be accomplished via the flow of pressurized fluid provided by hydraulic pump 38 and in response to operator commands. The extension and retraction of hydraulic cylinders 16 may be accomplished by creating an imbalance of force on a piston assembly (not shown) disposed within a tube (not shown) of hydraulic cylinders 16. Specifically, each of hydraulic cylinders 16 may include a first chamber (e.g., a head end) and a second chamber (e.g., a rod end) separated by the piston assembly. The piston assembly may include a piston axially aligned with and disposed within the tube. The piston may include two opposing hydraulic surfaces, a head end associated with the first chamber, and a rod end associated with the second chamber. The head end and rod end may be selectively supplied with a pressurized fluid and drained of the pressurized fluid to create an imbalance of force (i.e., pressure) between the two surfaces that cause the piston assembly to axially move within the tube. For example, a fluid pressure on the head end being greater than a fluid pressure on the rod end may cause the piston assembly to displace, thereby increasing the effective length of hydraulic cylinder 16. Similarly, when a fluid pressure acting on the rod end is greater than a fluid pressure acting on the head end, the piston assembly may retract within the tube to decrease the effective length of hydraulic cylinder 16.

Implement system 22 may also include sensing mechanisms configured to sense pressure, motion, position, and velocity, among other things, associated with implement system 22. Such sensors may include electrical and/or mechanical sensors or any combination thereof. For example, implement system hydraulic cylinder 16 may include one or more pressure sensors configured to transmit data related to one or more pressures associated with implement system hydraulic cylinder 16 (e.g., a head-end pressure and/or a rod-end pressure). Such pressure data may further be indicative of a load associated with implement 24 (e.g., the weight material in the bucket) and a corresponding weight on one or more axle assemblies (e.g., axle assemblies 21 and 23) supporting machine 10. In addition, other sensors may sense an angle of a linkage associated with implement system 22 and/or implement 24, a position of a linkage associated with implement system 22 and/or implement 24, and/or any other suitable characteristic of implement system 22 and/or implement 24. One of skill in the art will recognize that numerous methods for determining pressures associated with hydraulic cylinders based on sensor data exist in the art. Any and all such methods are contemplated by the present disclosure.

Figure 2:
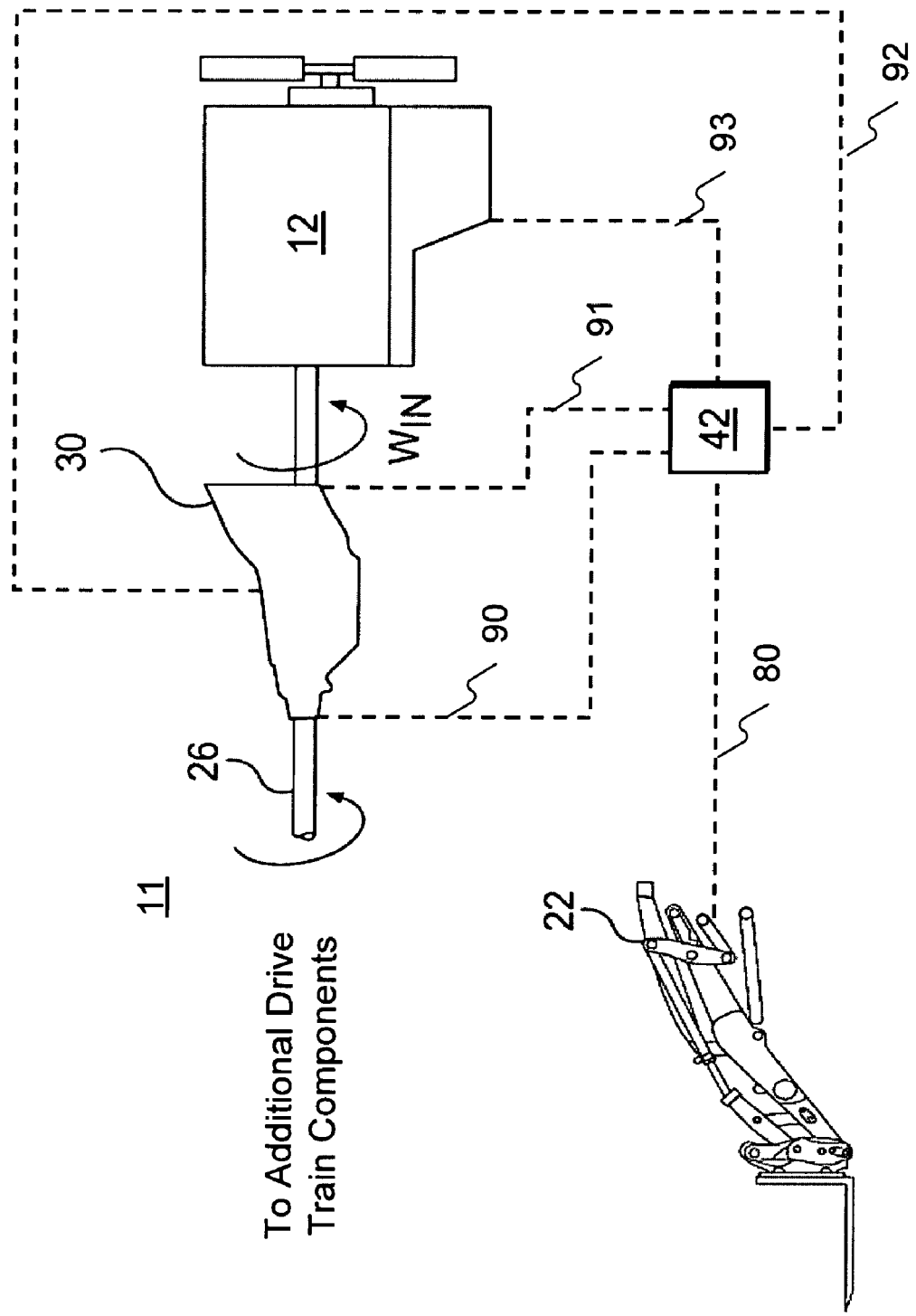
FIG. 2 is an exemplary illustration of a control communication schematic consistent with one embodiment of the present disclosure.

FIG. 2 is an exemplary illustration of a control communication schematic consistent with one embodiment of the present disclosure. Control module 42 may be a mechanical or an electrical based controller configured to receive and/or determine operating parameters associated with power source 12 and implement system 22, among other things. For example, control module 42 may be communicatively connected to sensors associated with implement system 22 (e.g., implement system hydraulic cylinders 16 via line 80) thereby enabling control module 42 to determine pressures (e.g., head-end pressures) associated with implement system 22 and/or implement 24 based on sensor data. In addition, sensors associated with power conversion unit 30 (e.g., input and output shaft speed sensors, gear selection sensors, etc.) may also be communicatively connected along, for example, lines 90 and 91 to control module 42, thereby allowing control module 42 to determine an input shaft speed, an output shaft speed, and a speed ratio, among other things, associated with power conversion unit 30.

Control module 42 may be configured to store data and algorithms related to speeds associated with components of drive train 11 (e.g., drive shafts 15), pressures associated with implement system 22 (e.g., head-end pressure of a hydraulic cylinder), torque distributions between front and rear axle assemblies 21 and 23, preferred torque values associated with components of drive train 11, predetermined threshold torque values associated with drive train 11 components, speed ratios associated with power source conversion unit 30 and the preferred torque values, and control signal data (e.g., fuel flow), among other things. Such data may be stored in a lookup table within control module 42 for reference, and/or portions of data may be calculated using algorithms stored within control module 42 and based on similar parameters. Such a configuration may enable a selection of a preferred torque value for one or more components associated with drive train 11 based on a particular pressure associated with implement system 22. For example, memory associated with control module 42 may include a lookup table containing data points indicating a preferred torque output associated with power conversion unit 30 based on a pressure associated with implement system 22 (e.g., a head-end pressure of a hydraulic cylinder). Such data may be experimentally collected and based on predetermined threshold torque values tolerances associated with one or more components related to drive train 11 (e.g., a front axle assembly), among other things. Alternatively, data may be calculated and stored in the memory based on a torque output associated with power conversion unit 30 and a pressure associated with implement system 22. Such calculations may be possible because a torque distribution between front and rear axle assemblies may be determined based on the output torque of power conversion unit 30 and the pressure associated with implement system 22. Therefore, for any particular pressure associated with implement system 22, a preferred torque value may be determined based on data within the lookup table.

In another embodiment, a drive train component torque limit may change based on a speed associated with the drive train component (i.e., rotational velocity). Damage to different components may be determined with a damage equation which is a function of both torque and component speed. These equations may be related to gear bending damage, roller bearing damage, gear pitting damage, among other things. In such an embodiment, for any particular pressure associated with implement system 22, and speed associated with a component of drive train 11, a preferred torque value may be determined based on data within the lookup table Control module 42 may also contain algorithms for determining an appropriate response to cause a modification to a torque output associated with power conversion unit 30. For example, where a preferred torque value has been determined based on the lookup table discussed above, control module 42 may calculate or otherwise determine an appropriate response to cause the torque output of power conversion unit 30 to approximate the preferred torque value. Such a response may include transmitting a signal via line 93 to a fuel control unit associated with power source 12 to modify a fuel flow, causing power conversion unit 30 to increase or decrease a related gear or speed ratio, and/or changing the angle of a swash plate associated with a hydro static drive pump. In another embodiment, a gear ratio related to power conversion unit 30 may be held constant while torque supplied to power conversion unit decreases based on a decreasing engine speed. One of ordinary skill in the art will recognize that other appropriate responses may be utilized and are intended to fall within the scope of the present disclosure.

INDUSTRIAL APPLICABILITY

The disclosed methods may be applicable to any powered system that includes an implement system and a power conversion unit configured to impart motion to a machine. The disclosed methods may allow for controlling a torque output of power conversion unit 30 based on a pressure associated with implement system 22. In particular, the disclosed systems and methods may assist in reducing machine stresses and damage, particularly those related to one or more drive train components (e.g., an axle assembly). Operation of the disclosed systems and methods will now be explained.

A power source may be configured to provide varying amounts of torque output based on power source speed (i.e., torque limited). For example, a power source may have a torque output of 500 Nm at a power source speed of 1500 RPM. This torque may be applied to various systems associated with the machine, such as, implement system 22 and drive train 11. Components associated with machine 10 may be limited in the amount of torque that can be applied before potentially being damaged. For example, axle assemblies 21 and 23 may be rated for a maximum 200 Nm of torque before potential damage occurs. Such damage may include gear bending, gear pitting, roller bearing damage, ball bearing damage, shaft shearing, etc. Therefore, it may be beneficial to limit the amount of torque flowing to the axle assembly from power source 12 and power conversion unit 30 below a predetermined threshold value (e.g., 200 Nm).

Implement systems associated with a machine may utilize torque provided by power source 12 to hydraulic pump 38 in the form of a flow of pressurized fluid. The pressure associated with the fluid and the volume of flow may cause torque output from power source 12 to vary based on, for example, the load on power source 12, the speed associated with power source 12, and a maximum torque associated with power source 12. Therefore, torque distribution to components of drive train 11 may also vary based on similar factors, and may be calculated based on output torque of power conversion unit 30 and the pressure associated with implement system 22. For example, a pressure associated with a lift head end of a hydraulic cylinder may cause a disproportionate amount of torque to pass to front axle assembly 21 and therefore, it may be desirable to limit the total power source torque in order to limit the torque passing to front axle assembly 21. Further, machines utilizing an implement may operate such an implement during periods when a gear selection associated with drive train 11 produces a low gear ratio (e.g., first gear) which may lead to greater torque applied to drive train components. Because torques greater than a predetermined threshold torque applied to a drive train component may cause damage and/or eventual failure, and because it is preferred to minimize such detrimental effects, methods for controlling torque applied to drive train components may be beneficial.

Figure 3:
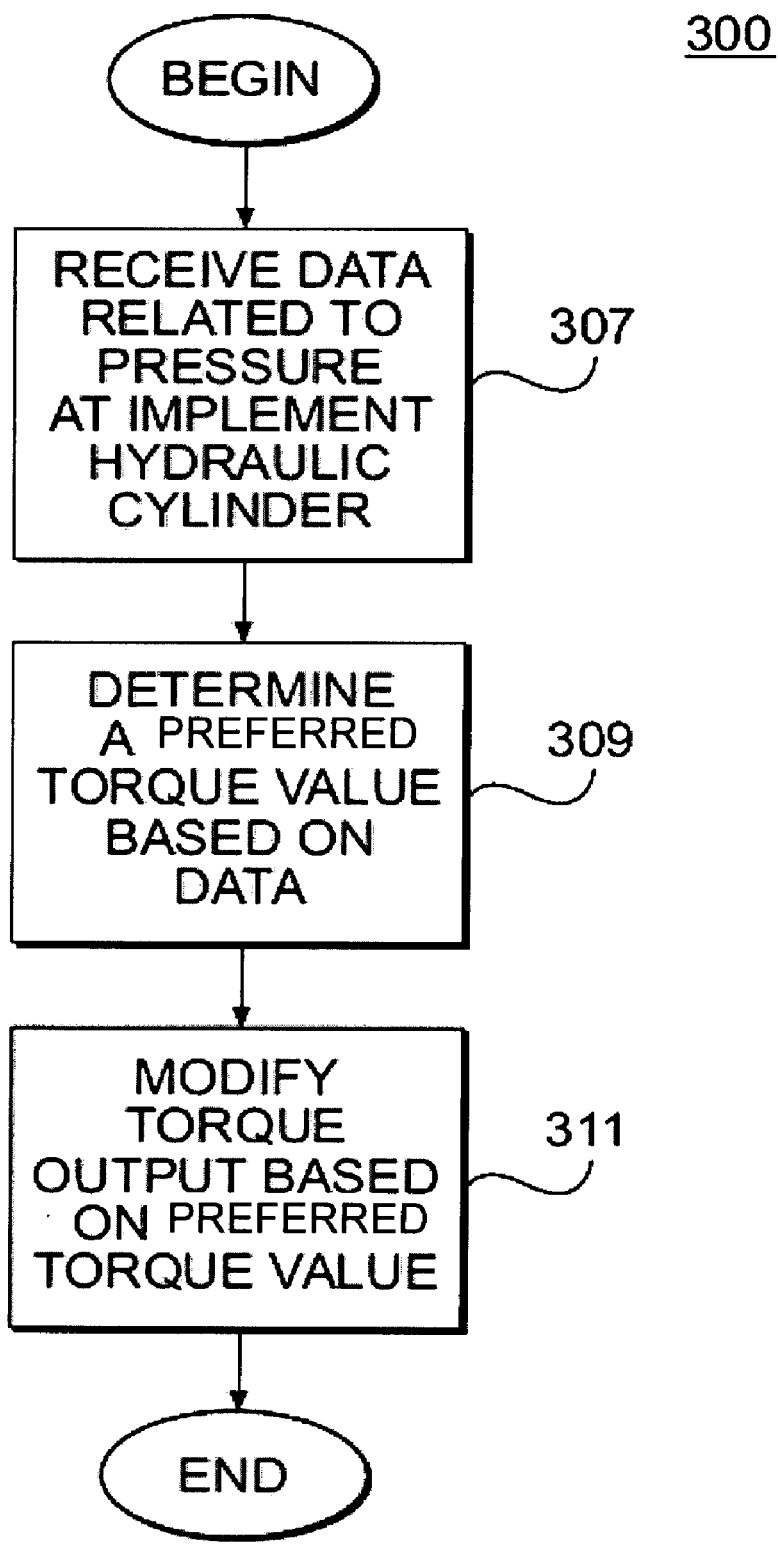
FIG. 3 is an exemplary flowchart illustrating a method for limiting a torque associated with a drive train.

FIG. 3 is an exemplary flowchart 300 illustrating a method for limiting a torque associated with a drive train. While the following example is discussed in the context of a power conversion unit 30 including a torque converter, one of skill in the art will recognize that similar methods may be applied to any other power conversion unit 30 known in the art. Control module 42 may receive data from a sensor associated with implement system 22 (e.g., implement system hydraulic cylinder 16), or other suitable device, indicating a pressure (e.g., lift head-end pressure, tilt head-end pressure, pressure associated with hydraulic pump 38, etc.) associated with implement system 22 (step 307). For example, pressure sensors associated with the head end of hydraulic cylinder 16 may indicate a pressure of approximately 7300 kPa and transmit such data to control module 42. When combined with torque output data from power conversion unit 30, such pressure data may enable control module 42 to determine a torque distribution between front and rear axle assemblies 21 and 23.

Control module 42 may then determine a preferred torque value based on the pressure data received and/or the torque distribution information (step 309). For example, control module 42 may determine that based on pressure data indicating a pressure of 7300 kPa associated with implement system 22, a preferred torque value may be 350 Nm such that the torque to one or more drive train components may remain below a predetermined threshold value. Because a torque output of a torque converter may be determined based on a speed ratio (Sc) as described above, control module 42 may also receive data from sensors associated with power conversion unit 30 (e.g., an input shaft and/or an output shaft), or other suitable device, indicating a speed associated with an input shaft and a speed associated with an output shaft of power conversion unit 30. For example, data indicating a speed of 2200 RPM associated with an input shaft of power conversion unit 30 and data indicating a speed of 440 RPM associated with an output shaft of power conversion unit 30 may be received by control module 42. Controller 42 may, therefore, determine that a speed ratio ($S_c$) is equal to 0.20. Alternatively, data provided to control module 42 by a sensor associated with power conversion unit 30 may indicate a speed ratio associated with power conversion unit 30.

Control module 42 may utilize such data and a look-up table or other suitable data structure to locate a data point where speed ratio ($S_c$) is approximately equal to 0.20 and a head-end pressure associated with a hydraulic cylinder of implement system 22 is approximately equal to 7300 kPa. Controller may determine that a desired power source speed is approximately equal to 2085 rotations per minute (RPM) based on such data. In other words, under such operating conditions, to limit the torque applied to one or more drive train components below a predetermined threshold value, power source speed should be maintained at 2085 RPM, thereby limiting torque output from power conversion unit 30 to the preferred torque value.

Once a desired power source speed has been determined, control module 42 may take appropriate action for modifying the torque output associated with power conversion unit 30 according to the preferred torque value which is the maximum allowable torque for components associated with an axle assembly (step 311). Where power conversion unit 30 includes a torque converter, control module 42 may modify a speed associated with power source 12 to accomplish the torque modification. For example, control module 42 may contain data or algorithms indicating particular fuel flow values based on a given loading of power source 12. Control module 42 may utilize such data to generate and transmit a signal to a fuel flow control device associated with power source 12, or other suitable device configured to modify operational parameter of power source 12, thereby affecting a modification of a speed associated with power source 12 and therefore a torque output of power conversion unit 30. In another embodiment, where power conversion unit 30 includes a CVT or similar transmission, control module 42 may modify a speed ration associated with power conversion unit 30 to accomplish the torque modification.

Control module 42 may also include data regarding a gear selection and related gear ratios associated with power conversion unit 30. Therefore, it may be possible to cease modification of a speed associated with power source 12 based upon when a gear selection associated with drive train 11 is greater than a predetermined gear selection. For example, it may be determined that a gear ratio associated with a first gear leads to greater torque stress and potential damage to components associated with drive train 11 that gear ratios associated with gears greater than first gear (i.e., second through fourth gears) do not produce. Therefore, control module 42 may be configured to detect a gear selection associated with drive train 11 and, where that gear selection (e.g., second gear) is greater than the predetermined gear (e.g., first gear), control module 42 may take no action to modify the speed associated with power source 12. One of skill in the art will recognize that numerous configurations are possible with such an arrangement. For example, the predetermined gear selection may include both a first and a second gear, in which case, all gears greater than first and second may cause control module 42 to cease modification of power source 12. Additionally, more or fewer gears may be included with drive train 11, and the foregoing discussion is meant as exemplary only. Thus the system may limit torque by either affecting engine output, changing gear ratios, power conversion unit output, or a combination thereof.

While the foregoing was discussed in the context of a power conversion unit 30 including a torque converter, one of ordinary skill in the art will recognize that such methods may be applied to power conversion units that do not include a torque converter (e.g., constantly variable transmission, hydro static drive, split torque transmission, etc.). For example, where a constantly variable transmission is utilized, following the determination of a preferred torque value control module 42 transmit a signal via line 92 to the constantly variable transmission indicating that the torque output should be modified to approximate the preferred torque value. Such a signal may cause the constantly variable transmission to adjust a related speed ratio to accomplish the torque modification.

Because the method and system of the present disclosure consider torques applied to one or more power train components and adjust torque output to maintain torque output below a predetermined threshold value, drive train component useful life may be extended while still allowing efficient operation of implement systems.

It will be apparent to those skilled in the art that various modifications and variations can be made in the disclosed methods and systems without departing from the scope of the disclosure. Additionally, other embodiments of methods for limiting drive train torque will be apparent to those skilled in the art from consideration of the specification. It is intended that the specification and examples be considered as exemplary only, with a true scope of the disclosure being indicated by the following claims and their equivalents.

I claim:

1. A method for controlling a torque output associated with a power conversion unit, the method comprising:
   receiving data related to a pressure associated with an implement system hydraulic cylinder;
   determining a torque output of the power conversion unit;
   determining, based on the torque output and the data, a torque distribution associated with one or more drive train components;

determining, based on at least the data, a speed, and the torque output, a preferred torque value for one or more of the drive train components; and modifying the torque output of the power conversion unit to approximate the preferred torque value.

2. The method of claim 1, wherein the pressure associated with the implement system hydraulic cylinder is at least one of a lift head-end pressure and a tilthead-end pressure.

3. The method of claim 1, wherein the power conversion unit includes at least one of an automatic transmission, a constantly variable transmission, and a hydro-static drive transmission.

4. The method of claim 1, wherein determining the preferred torque value includes locating the preferred torque value in a reference table.

5. The method of claim 4, wherein the reference table identifies the preferred torque value based on the data.

6. The method of claim 1, wherein at least one of the drive train components includes an axle assembly.

7. The method of claim 1, further including determining a gear selection associated with the power conversion unit and modifying an associated gear ratio.

8. The method of claim 7, wherein the modifying is disabled when the gear selection indicates a selected gear greater than a predetermined gear.

9. The method of claim 1, wherein determining the torque output includes determining the torque output based on an input speed and a speed ratio of the power conversion unit.

10. A system for controlling a torque associated with a drive train, the system comprising:
a power conversion unit operatively connected to the drive train;
one or more hydraulic implement cylinders; and
a control module configured to:
receive data related to a pressure associated with the one or more hydraulic implement cylinders;
determine a torque output of the power conversion unit;
determine, based on the torque output and the data, a torque distribution associated with one or more drive train components;
determine, based on at least the data, a speed, and the torque output, a preferred torque value, wherein the preferred torque value is below a predetermined threshold value associated with one or more drive train components; and
modify the torque output of the power conversion unit to approximate the preferred torque value.

11. The system of claim 10, wherein the pressure associated with the one or more hydraulic implement cylinders is at least one of a lift head-end pressure and a tilt head-end pressure.

12. The system of claim 10, wherein the power conversion unit includes at least one of an automatic transmission, a continuously variable transmission, and a hydro-static drive transmission.

13. The system of claim 10, wherein the controller includes a reference table that identifies the preferred torque value based on the data.

14. The system of claim 10, wherein at least one of the drive train components includes an axle assembly.

15. The system of claim 10, further including determining a gear selection associated with the power conversion unit.

16. The system of claim 15, wherein the modifying is disabled when the gear selection indicates a selected gear greater than a predefined gear.

17. The system of claim 10, wherein the control module is configured to determine the torque output based on an input speed and a speed ratio of the power conversion unit.

18. A machine, comprising:
a frame;
a traction device associated with one or more drive train components;
one or more implement system hydraulic cylinders operatively connected to the frame;
a power source mounted to the frame and operatively connected to a power conversion unit, the power conversion unit operatively connected to the one or more traction devices; and
a control module configured to:
receive data related to a pressure associated with the one or more implement system hydraulic cylinders;
determine a torque output of the power conversion unit;
determine, based on the torque output and the data, a torque distribution associated with one or more drive train components;
determine, based on the data, an input speed, and a speed ratio associated with the power conversion unit, a preferred torque value, wherein the preferred torque value is below a predetermined threshold value associated with one or more drive train components; and
modify the torque output of the power conversion unit to approximate the preferred torque value.

19. The machine of claim 18, wherein the pressure associated with the one or more implement system hydraulic cylinders is at least one of a lift head-end pressure and a tilt head-end pressure.

20. The machine of claim 18, wherein the power conversion unit includes a torque converter.

* * * * *